United States Patent
Rukavina et al.

(10) Patent No.: US 9,775,483 B2
(45) Date of Patent: Oct. 3, 2017

(54) VACUUM CLEANER HAVING CYCLONIC SEPARATOR

(71) Applicant: Techtronic Industries Co. Ltd., Tsuen Wan, New Territories (HK)

(72) Inventors: Douglas M. Rukavina, Massillon, OH (US); Matthew Redinger, Mecedoina, OH (US); Juan Aviles, Aurora, OH (US); Richard Friend, Streetsboro, OH (US); William Nabors, Copley, OH (US)

(73) Assignee: Techtronic Industries Co. Ltd., Tsuen Wan, New Territories (HK)

( * ) Notice: Subject to any disclaimer, the term of this patent is extended or adjusted under 35 U.S.C. 154(b) by 176 days.

(21) Appl. No.: 14/920,157

(22) Filed: Oct. 22, 2015

(65) Prior Publication Data
US 2016/0113461 A1  Apr. 28, 2016

Related U.S. Application Data

(60) Provisional application No. 62/067,299, filed on Oct. 22, 2014.

(51) Int. Cl.
*A47L 9/16* (2006.01)
*B01D 45/12* (2006.01)

(52) U.S. Cl.
CPC .............. *A47L 9/1608* (2013.01); *A47L 9/16* (2013.01); *B01D 45/12* (2013.01)

(58) Field of Classification Search
CPC ......... A47L 9/16; A47L 9/1608; B01D 45/12; B01D 45/16

(Continued)

(56) References Cited

U.S. PATENT DOCUMENTS 2,657,417 A  11/1953  Howard
4,268,288 A   5/1981  Coombs
(Continued)

FOREIGN PATENT DOCUMENTS

CA  2599303  2/2009
EP  1681099  7/2006
(Continued)

OTHER PUBLICATIONS

International Search Report and Written Opinion for Application No. PCT/US2015/056915 dated Feb. 3, 2013 (11 pages).

*Primary Examiner* — David Redding
(74) *Attorney, Agent, or Firm* — Michael Best & Friedrich LLP (57) ABSTRACT

A vacuum cleaner including a debris separator having a cyclonic separator including a cylindrical wall having a first end and a second end, the cylindrical wall located in within the housing, the cyclonic separator further including a dirty air inlet, a clean air outlet, an end wall at the first end of the cylindrical wall, and a debris outlet adjacent the second end of the cylindrical wall. The debris separator further includes a lid coupled to an upper end of the housing, a debris collection chamber located within the housing and in fluid communication with the debris outlet of the cyclonic separator, and a door coupled to a lower end of the housing to empty the debris collection chamber through the lower end of the housing. A portion of the cyclonic separator is removable from the housing through the lower end of the housing.

26 Claims, 7 Drawing Sheets

(58) Field of Classification Search
USPC .............. 15/353; 55/337, 345, 336, DIG. 3
IPC ....................................................... A47L 9/16
See application file for complete search history.

(56) References Cited

U.S. PATENT DOCUMENTS

| | | |
|---|---|---|
| 4,403,372 A | 9/1983 | Keane et al. |
| 4,789,476 A | 12/1988 | Schulz |
| 4,853,008 A | 8/1989 | Dyson |
| 5,350,432 A | 9/1994 | Lee |
| 5,779,745 A | 7/1998 | Kilstrom |
| 5,935,279 A | 8/1999 | Kilstrom |
| 5,950,274 A | 9/1999 | Kilstrom |
| 6,003,196 A | 12/1999 | Wright et al. |
| 6,129,775 A | 10/2000 | Conrad et al. |
| 6,141,826 A | 11/2000 | Conrad et al. |
| 6,168,641 B1 | 1/2001 | Tuvin et al. |
| 6,168,716 B1 | 1/2001 | Conrad et al. |
| 6,173,474 B1 | 1/2001 | Conrad |
| 6,195,835 B1 | 3/2001 | Song et al. |
| 6,221,134 B1 | 4/2001 | Conrad et al. |
| 6,228,151 B1 | 5/2001 | Conrad et al. |
| 6,228,260 B1 | 5/2001 | Conrad et al. |
| 6,231,645 B1 | 5/2001 | Conrad et al. |
| 6,251,296 B1 | 6/2001 | Conrad et al. |
| 6,277,278 B1 | 8/2001 | Conrad et al. |
| 6,306,199 B1 | 10/2001 | Gustafson et al. |
| 6,312,594 B1 | 11/2001 | Conrad et al. |
| 6,334,234 B1 | 1/2002 | Conrad et al. |
| 6,344,064 B1 | 2/2002 | Conrad |
| 6,350,292 B1 | 2/2002 | Lee et al. |
| 6,391,095 B1 | 5/2002 | Conrad et al. |
| 6,398,834 B2 | 6/2002 | Oh |
| 6,406,505 B1 | 6/2002 | Oh et al. |
| 6,419,719 B2 | 7/2002 | Conrad et al. |
| 6,432,154 B2 | 8/2002 | Oh et al. |
| 6,440,197 B1 | 8/2002 | Conrad et al. |
| 6,482,246 B1 | 11/2002 | Dyson et al. |
| 6,485,536 B1 | 11/2002 | Masters |
| 6,502,277 B1 | 1/2003 | Petersson et al. |
| 6,502,278 B2 | 1/2003 | Oh et al. |
| 6,519,804 B1 | 2/2003 | Vujik |
| 6,532,620 B2 | 3/2003 | Oh |
| 6,533,834 B2 | 3/2003 | Conrad et al. |
| 6,536,073 B2 | 3/2003 | Uratani et al. |
| 6,546,593 B2 | 4/2003 | Oh et al. |
| 6,553,612 B1 | 4/2003 | Dyson et al. |
| 6,558,453 B2 | 5/2003 | Sepke et al. |
| 6,562,093 B2 | 5/2003 | Oh |
| 6,572,668 B1 | 6/2003 | An et al. |
| 6,578,230 B2 | 6/2003 | Park et al. |
| 6,579,334 B2 | 6/2003 | Oh et al. |
| 6,582,489 B2 | 6/2003 | Conrad |
| 6,588,051 B2 | 7/2003 | Hashizume et al. |
| 6,589,309 B2 | 7/2003 | Oh et al. |
| 6,596,045 B2 | 7/2003 | Qian |
| 6,596,046 B2 | 7/2003 | Conrad et al. |
| 6,596,047 B2 | 7/2003 | Oh |
| 6,599,338 B2 | 7/2003 | Oh et al. |
| 6,599,339 B2 | 7/2003 | Oh |
| 6,599,340 B2 | 7/2003 | Conrad et al. |
| 6,607,572 B2 | 8/2003 | Gammack et al. |
| 6,607,575 B2 | 8/2003 | Oh et al. |
| 6,613,116 B2 | 9/2003 | Oh |
| 6,613,129 B2 | 9/2003 | Gen |
| 6,616,721 B2 | 9/2003 | Oh |
| 6,623,539 B2 | 9/2003 | Lee et al. |
| 6,625,845 B2 | 9/2003 | Matsumoto et al. |
| 6,640,385 B2 | 11/2003 | Oh et al. |
| 6,648,934 B2 | 11/2003 | Choi et al. |
| 6,660,053 B2 | 12/2003 | Oh et al. |
| 6,662,403 B2 | 12/2003 | Oh |
| 6,679,930 B1 | 1/2004 | An et al. |
| 6,702,868 B2 | 3/2004 | Oh et al. |
| 6,706,095 B2 | 3/2004 | Morgan |
| 6,709,495 B1 | 3/2004 | Storer |
| 6,712,868 B2 | 3/2004 | Murphy et al. |
| 6,732,405 B2 | 5/2004 | Oh |
| 6,732,406 B2 | 5/2004 | Oh |
| 6,735,816 B2 | 5/2004 | Oh et al. |
| 6,736,873 B2 | 5/2004 | Conrad et al. |
| 6,746,500 B1 | 6/2004 | Park et al. |
| 6,757,933 B2 | 7/2004 | Oh et al. |
| 6,766,557 B2 | 7/2004 | Park et al. |
| 6,766,558 B1 | 7/2004 | Matsumoto et al. |
| 6,782,583 B2 | 8/2004 | Oh |
| 6,782,585 B1 | 8/2004 | Conrad et al. |
| 6,810,557 B2 | 11/2004 | Hansen et al. |
| 6,810,558 B2 | 11/2004 | Lee |
| 6,811,584 B2 | 11/2004 | Oh |
| 6,818,033 B2 | 11/2004 | North |
| 6,818,036 B1 | 11/2004 | Seaman |
| 6,824,580 B2 | 11/2004 | Oh |
| 6,833,015 B2 | 12/2004 | Oh et al. |
| 6,835,222 B2 | 12/2004 | Gammack |
| 6,840,972 B1 | 1/2005 | Kim |
| 6,857,165 B2 | 2/2005 | Oh |
| 6,868,578 B1 | 3/2005 | Kasper et al. |
| 6,874,197 B1 | 4/2005 | Conrad et al. |
| 6,896,711 B2 | 5/2005 | Oh |
| 6,901,626 B2 | 6/2005 | Bair et al. |
| 6,902,596 B2 | 6/2005 | Conrad et al. |
| 6,916,351 B2 | 7/2005 | Oh |
| 6,925,680 B2 | 8/2005 | Oh |
| 6,928,692 B2 | 8/2005 | Oh et al. |
| 6,948,212 B2 | 9/2005 | Oh et al. |
| 6,951,045 B2 | 10/2005 | Thur et al. |
| 6,968,596 B2 | 11/2005 | Oh et al. |
| 6,974,488 B2 | 12/2005 | Dyson |
| 6,977,003 B2 | 12/2005 | Lim et al. |
| 6,989,039 B2 | 1/2006 | Vujik |
| 6,991,666 B2 | 1/2006 | Organ |
| 6,994,740 B2 | 2/2006 | Gammack et al. |
| 7,014,671 B2 | 3/2006 | Oh |
| 7,022,154 B2 | 4/2006 | Oh |
| 7,065,826 B1 | 6/2006 | Arnold |
| 7,074,248 B2 | 7/2006 | Jin et al. |
| 7,086,119 B2 | 8/2006 | Go et al. |
| 7,097,680 B2 | 8/2006 | Oh |
| 7,105,034 B2 | 9/2006 | Jung et al. |
| 7,105,035 B2 | 9/2006 | Oh et al. |
| 7,114,216 B2 | 10/2006 | Stephens et al. |
| 7,128,770 B2 | 10/2006 | Oh et al. |
| 7,140,068 B1 | 11/2006 | Vander Baan et al. |
| 7,152,276 B2 | 12/2006 | Jin et al. |
| 7,152,277 B2 | 12/2006 | Jung et al. |
| 7,160,346 B2 | 1/2007 | Park |
| 7,162,770 B2 | 1/2007 | Davidshofer |
| 7,163,568 B2 | 1/2007 | Sepke et al. |
| 7,169,201 B2 | 1/2007 | Oh et al. |
| 7,171,725 B2 | 2/2007 | Sjoberg et al. |
| 7,188,388 B2 | 3/2007 | Best et al. |
| 7,210,192 B2 | 5/2007 | Ito et al. |
| 7,228,592 B2 | 6/2007 | Hawkins et al. |
| 7,247,181 B2 | 7/2007 | Hansen et al. |
| 7,261,754 B2 | 8/2007 | Oh et al. |
| 7,273,506 B2 | 9/2007 | Oh et al. |
| 7,276,099 B2 | 10/2007 | Hayashi et al. |
| 7,288,129 B2 | 10/2007 | Oh et al. |
| 7,291,190 B2 | 11/2007 | Dummelow |
| 7,291,193 B2 | 11/2007 | Oh et al. |
| 7,293,326 B2 | 11/2007 | Hawkins et al. |
| 7,294,159 B2 | 11/2007 | Oh et al. |
| 7,297,172 B2 | 11/2007 | Lee |
| 7,309,368 B2 | 12/2007 | Oh et al. |
| 7,326,268 B2 | 2/2008 | Oh et al. |
| 7,329,295 B2 | 2/2008 | Greene et al. |
| 7,331,084 B2 | 2/2008 | Oh |
| 7,332,008 B2 | 2/2008 | Oh et al. |
| 7,334,290 B2 | 2/2008 | Hawkins et al. |
| 7,335,241 B2 | 2/2008 | Oh et al. |
| 7,335,242 B2 | 2/2008 | Oh |
| 7,341,611 B2 | 3/2008 | Greene et al. |
| 7,343,643 B2 | 3/2008 | Kondo |

(56) References Cited

U.S. PATENT DOCUMENTS

| | | |
|---|---|---|
| 7,354,468 B2 | 4/2008 | Arnold et al. |
| 7,361,200 B2 | 4/2008 | Oh et al. |
| 7,377,007 B2 | 5/2008 | Best |
| 7,377,953 B2 | 5/2008 | Oh |
| 7,381,233 B2 | 6/2008 | Oh et al. |
| 7,381,234 B2 | 6/2008 | Oh |
| 7,381,236 B2 | 6/2008 | Lee et al. |
| 7,381,247 B2 | 6/2008 | Han et al. |
| 7,381,248 B2 | 6/2008 | Kim et al. |
| 7,395,579 B2 | 7/2008 | Oh |
| 7,398,578 B2 | 7/2008 | Lee |
| 7,404,231 B2 | 7/2008 | Kang |
| 7,407,524 B2 | 8/2008 | Han et al. |
| 7,409,744 B2 | 8/2008 | Go et al. |
| 7,410,517 B2 | 8/2008 | Han et al. |
| 7,410,535 B2 | 8/2008 | Song et al. |
| 7,416,575 B2 | 8/2008 | Oh et al. |
| 7,419,521 B2 | 9/2008 | Oh et al. |
| 7,419,522 B2 | 9/2008 | Arnold |
| 7,419,523 B2 | 9/2008 | Sjöberg et al. |
| 7,422,614 B2 | 9/2008 | Sepke et al. |
| 7,422,615 B2 | 9/2008 | Kim |
| 7,429,284 B2 | 9/2008 | Oh et al. |
| 7,438,737 B2 | 10/2008 | Song et al. |
| 7,448,146 B2 | 11/2008 | Cho et al. |
| 7,449,039 B2 | 11/2008 | Hong et al. |
| 7,449,040 B2 | 11/2008 | Conrad et al. |
| 7,455,708 B2 | 11/2008 | Conrad et al. |
| 7,462,212 B2 | 12/2008 | Han et al. |
| 7,470,299 B2 | 12/2008 | Han et al. |
| 7,473,289 B2 | 1/2009 | Oh et al. |
| 7,475,449 B2 | 1/2009 | Lee |
| 7,479,172 B2 | 1/2009 | Ivarsson |
| 7,479,173 B2 | 1/2009 | Ivarsson et al. |
| 7,481,860 B2 | 1/2009 | Ivarsson |
| 7,485,164 B2 | 2/2009 | Jeong et al. |
| 7,491,255 B2 | 2/2009 | Jung |
| 7,494,523 B2 | 2/2009 | Oh et al. |
| 7,497,899 B2 | 3/2009 | Han et al. |
| 7,501,002 B2 | 3/2009 | Han et al. |
| 7,513,924 B2 | 4/2009 | French et al. |
| 7,534,279 B2 | 5/2009 | Oh et al. |
| 7,537,625 B2 | 5/2009 | Han et al. |
| 7,544,224 B2 | 6/2009 | Tanner et al. |
| 7,544,226 B2 | 6/2009 | Oh |
| 7,547,336 B2 | 6/2009 | Fester et al. |
| 7,547,337 B2 | 6/2009 | Oh et al. |
| 7,547,338 B2 | 6/2009 | Kim et al. |
| 7,547,351 B2 | 6/2009 | Oh et al. |
| 7,555,808 B2 | 7/2009 | Oh et al. |
| 7,556,661 B2 | 7/2009 | Jeong et al. |
| 7,556,662 B2 | 7/2009 | Lee et al. |
| 7,559,963 B2 | 7/2009 | Oh et al. |
| 7,559,964 B2 | 7/2009 | Oh et al. |
| 7,559,965 B2 | 7/2009 | Oh et al. |
| 7,563,296 B2 | 7/2009 | Ni |
| 7,563,297 B2 | 7/2009 | Kim |
| 7,563,298 B2 | 7/2009 | Oh |
| 7,565,853 B2 | 7/2009 | Arnold et al. |
| 7,582,128 B2 | 9/2009 | Hwang et al. |
| 7,582,129 B2 | 9/2009 | Kim et al. |
| 7,594,943 B2 | 9/2009 | Oh et al. |
| 7,594,944 B2 | 9/2009 | Oh |
| 7,594,945 B2 | 9/2009 | Kim et al. |
| 7,597,730 B2 | 10/2009 | Yoo et al. |
| 7,604,674 B2 | 10/2009 | Han et al. |
| 7,604,675 B2 | 10/2009 | Makarov et al. |
| 7,611,558 B2 | 11/2009 | Oh et al. |
| 7,615,089 B2 | 11/2009 | Oh |
| 7,618,470 B2 | 11/2009 | Eddington et al. |
| 7,628,831 B2 | 12/2009 | Gomiciaga-Pereda et al. |
| 7,628,832 B2 | 12/2009 | Sepke et al. |
| 7,628,833 B2 | 12/2009 | Oh |
| 7,632,324 B2 | 12/2009 | Makarov et al. |
| 7,632,327 B2 | 12/2009 | Yoo |
| 7,635,400 B2 | 12/2009 | Yoo |
| 7,637,973 B2 | 12/2009 | Oh et al. |
| 7,637,991 B2 | 12/2009 | Eddington et al. |
| 7,645,311 B2 | 1/2010 | Oh et al. |
| 7,651,544 B1 | 1/2010 | Fester et al. |
| 7,662,201 B2 | 2/2010 | Lee |
| 7,662,202 B2 | 2/2010 | Oh et al. |
| 7,678,166 B2 | 3/2010 | Yoo et al. |
| 7,682,412 B2 | 3/2010 | Oh |
| 7,686,858 B2 | 3/2010 | Oh |
| 7,686,861 B2 | 3/2010 | Oh |
| 7,691,161 B2 | 4/2010 | Oh et al. |
| 7,704,290 B2 | 4/2010 | Oh |
| 7,708,789 B2 | 5/2010 | Fester |
| 7,708,791 B2 | 5/2010 | Oh et al. |
| 7,708,808 B1 | 5/2010 | Heumann |
| 7,717,973 B2 | 5/2010 | Oh et al. |
| 7,722,693 B2 | 5/2010 | Yoo et al. |
| 7,731,770 B2 | 6/2010 | Strutt et al. |
| 7,740,675 B2 | 6/2010 | Conrad |
| 7,743,461 B2 | 6/2010 | Carr et al. |
| 7,744,667 B2 | 6/2010 | Oh et al. |
| 7,744,668 B2 | 6/2010 | Oh et al. |
| 7,748,079 B2 | 7/2010 | McDowell et al. |
| 7,749,293 B2 | 7/2010 | Conrad |
| 7,749,296 B2 | 7/2010 | Han et al. |
| 7,763,090 B2 | 7/2010 | Gomiciaga-Pereda et al. |
| 7,770,256 B1 | 8/2010 | Fester |
| 7,771,499 B2 | 8/2010 | Oh et al. |
| 7,776,115 B2 | 8/2010 | Oh et al. |
| 7,776,116 B2 | 8/2010 | Oh et al. |
| 7,776,120 B2 | 8/2010 | Conrad |
| 7,776,121 B2 | 8/2010 | Yun et al. |
| 7,780,752 B2 | 8/2010 | Cha et al. |
| 7,785,381 B2 | 8/2010 | Oh et al. |
| 7,785,383 B2 | 8/2010 | Oh et al. |
| 7,789,922 B1 | 9/2010 | Wai |
| 7,789,923 B2 | 9/2010 | Oh et al. |
| 7,794,515 B2 | 9/2010 | Oh et al. |
| 7,803,205 B2 | 9/2010 | Oh et al. |
| 7,803,207 B2 | 9/2010 | Conrad |
| 7,806,950 B2 | 10/2010 | Han et al. |
| 7,811,345 B2 | 10/2010 | Conrad |
| 7,811,349 B2 | 10/2010 | Nguyen |
| 7,819,933 B2 | 10/2010 | Moon et al. |
| 7,828,866 B2 | 11/2010 | Courtney et al. |
| 7,841,477 B2 | 11/2010 | Hansen |
| 7,854,779 B2 | 12/2010 | Oh |
| 7,854,782 B2 | 12/2010 | Oh et al. |
| 7,862,637 B2 | 1/2011 | Han et al. |
| 7,867,306 B2 | 1/2011 | Courtney et al. |
| 7,867,307 B2 | 1/2011 | Bates et al. |
| 7,867,308 B2 | 1/2011 | Conrad |
| 7,874,040 B2 | 1/2011 | Follows et al. |
| 7,879,120 B2 | 2/2011 | Seo et al. |
| 7,879,121 B2 | 2/2011 | Oh |
| 7,879,142 B2 | 2/2011 | Han et al. |
| 7,882,592 B2 | 2/2011 | Hwang et al. |
| 7,882,593 B2 | 2/2011 | Beskow et al. |
| 7,887,612 B2 | 2/2011 | Courad |
| 7,887,613 B2 | 2/2011 | Ruben |
| 7,907,680 B2 | 3/2011 | Tsai et al. |
| 7,908,706 B2 | 3/2011 | Hawkins et al. |
| 7,914,609 B2 | 3/2011 | Sullivan et al. |
| 7,918,909 B2 | 4/2011 | McDowell |
| 7,922,794 B2 | 4/2011 | Morphey |
| 7,931,717 B2 | 4/2011 | Conrad |
| 7,931,722 B2 | 4/2011 | Sepke et al. |
| 7,938,872 B2 | 5/2011 | Blossey et al. |
| 7,941,895 B2 | 5/2011 | Conrad |
| 7,951,216 B2 | 5/2011 | Ha et al. |
| 7,951,218 B2 | 5/2011 | Oh |
| 7,966,692 B2 | 6/2011 | Kim |
| 7,967,884 B2 | 6/2011 | Sepke et al. |
| 7,981,181 B2 | 7/2011 | Yoo |
| 7,992,252 B2 | 8/2011 | Park et al. |
| 7,996,956 B2 | 8/2011 | Wood et al. |
| 7,996,957 B2 | 8/2011 | Kah, Jr. |
| 7,998,260 B2 | 8/2011 | Ni |

(56) References Cited

U.S. PATENT DOCUMENTS

| | | |
|---|---|---|
| 8,015,659 B2 | 9/2011 | Conrad et al. |
| 8,020,707 B2 | 9/2011 | Kim et al. |
| 8,021,453 B2 | 9/2011 | Howes |
| 8,034,140 B2 | 10/2011 | Conrad |
| 8,048,180 B2 | 11/2011 | Oh et al. |
| 8,048,183 B2 | 11/2011 | Conrad |
| 8,062,398 B2 | 11/2011 | Luo et al. |
| 8,097,057 B2 | 1/2012 | Arnold |
| 8,100,999 B2 | 1/2012 | Ashbee et al. |
| 8,146,201 B2 | 4/2012 | Conrad |
| 8,151,407 B2 | 4/2012 | Conrad |
| 8,152,877 B2 | 4/2012 | Greene |
| 8,152,878 B2 | 4/2012 | McLeod |
| 8,152,883 B2 | 4/2012 | Lee |
| 8,161,597 B2 | 4/2012 | Witter et al. |
| 8,161,599 B2 | 4/2012 | Griffith et al. |
| 8,167,964 B2 | 5/2012 | Wai |
| 8,176,597 B2 | 5/2012 | Stein et al. |
| 8,182,563 B2 | 5/2012 | Horne et al. |
| 8,186,006 B2 | 5/2012 | Hyun et al. |
| 8,192,515 B2 | 6/2012 | Conrad |
| 8,209,815 B2 | 7/2012 | Makarov et al. |
| 8,250,702 B2 | 8/2012 | Conrad |
| 8,252,096 B2 | 8/2012 | Horne |
| 8,268,029 B2 | 9/2012 | Yoo |
| 8,282,697 B2 | 10/2012 | Oh |
| 8,292,979 B2 | 10/2012 | Conrad |
| 8,302,252 B2 | 11/2012 | Hyun et al. |
| 8,302,253 B2 | 11/2012 | Ni |
| 8,316,507 B2 | 11/2012 | Hyun et al. |
| 8,348,605 B2 | 1/2013 | de Broqueville |
| 8,349,428 B2 | 1/2013 | Conrad |
| 8,361,179 B2 | 1/2013 | Guerry et al. |
| 8,375,509 B2 | 2/2013 | Bates et al. |
| 8,409,335 B2 | 4/2013 | Dyson et al. |
| 8,419,835 B2 | 4/2013 | Krishnamurthy et al. |
| 8,425,642 B2 | 4/2013 | Worker et al. |
| 8,448,291 B2 | 5/2013 | Conrad |
| 8,448,292 B2 | 5/2013 | Miefalk et al. |
| 8,479,358 B2 | 7/2013 | Conrad |
| 8,484,799 B2 | 7/2013 | Conrad |
| 8,486,170 B2 | 7/2013 | Conrad et al. |
| 8,495,789 B2 | 7/2013 | Nicolaou et al. |
| 8,499,411 B2 | 8/2013 | Tran et al. |
| 8,510,907 B2 | 8/2013 | Conrad |
| 8,528,160 B2 | 9/2013 | Conrad |
| 8,528,163 B2 | 9/2013 | Park et al. |
| 8,528,164 B2 | 9/2013 | Conrad |
| 8,533,903 B2 | 9/2013 | Muhlenkamp et al. |
| 8,533,904 B2 | 9/2013 | Conrad |
| 8,561,257 B2 | 10/2013 | Conrad |
| 8,562,705 B2 | 10/2013 | Courtney et al. |
| 8,567,005 B2 | 10/2013 | Conrad |
| 8,567,006 B2 | 10/2013 | Conrad |
| 8,567,008 B2 | 10/2013 | Conrad |
| 8,568,500 B2 | 10/2013 | Han et al. |
| 8,572,789 B2 | 11/2013 | Horne |
| 8,578,550 B2 | 11/2013 | Conrad |
| 8,578,553 B2 | 11/2013 | Conrad |
| 8,578,555 B2 | 11/2013 | Conrad |
| 8,590,102 B2 | 11/2013 | Conrad |
| 8,601,641 B2 | 12/2013 | Conrad |
| 8,607,406 B2 | 12/2013 | Miefalk et al. |
| 8,607,407 B2 | 12/2013 | Conrad |
| 8,613,125 B2 | 12/2013 | Jeong et al. |
| 8,621,709 B2 | 1/2014 | Conrad |
| 8,631,538 B2 | 1/2014 | Huffman |
| 8,640,303 B2 | 2/2014 | Conrad |
| 8,640,304 B2 | 2/2014 | Conrad |
| 8,646,146 B2 | 2/2014 | Conrad |
| 8,646,147 B2 | 2/2014 | Conrad |
| 8,646,148 B2 | 2/2014 | Sunderland et al. |
| 8,646,149 B2 | 2/2014 | Conrad |
| 8,646,849 B2 | 2/2014 | Crawford et al. |
| 8,657,903 B2 | 2/2014 | Menssen |
| 8,659,184 B2 | 2/2014 | Conrad |
| 8,661,607 B2 | 3/2014 | Hwang et al. |
| 8,661,611 B2 | 3/2014 | Oh |
| 8,667,640 B2 | 3/2014 | Conrad |
| 8,677,554 B2 | 3/2014 | Conrad |
| 8,677,558 B2 | 3/2014 | Conrad |
| 8,683,644 B2 | 4/2014 | Conrad |
| 8,689,395 B2 | 4/2014 | Conrad |
| 8,689,401 B2 | 4/2014 | Makarov et al. |
| 8,695,157 B2 | 4/2014 | Beskow et al. |
| 8,713,751 B2 | 5/2014 | Conrad |
| 8,713,754 B2 | 5/2014 | Conrad |
| 8,739,357 B2 | 6/2014 | Conrad |
| 8,739,359 B2 | 6/2014 | Conrad |
| 8,752,239 B2 | 6/2014 | Conrad |
| 8,763,202 B2 | 7/2014 | Conrad |
| 8,769,767 B2 | 7/2014 | Conrad |
| 8,776,309 B2 | 7/2014 | Conrad |
| 2002/0011050 A1 | 1/2002 | Hansen et al. |
| 2002/0134059 A1 | 9/2002 | Oh |
| 2003/0159235 A1 | 8/2003 | Oh |
| 2003/0159411 A1 | 8/2003 | Hansen et al. |
| 2003/0200734 A1 | 10/2003 | Conrad |
| 2004/0098827 A1 | 5/2004 | Oh |
| 2004/0098828 A1 | 5/2004 | Oh |
| 2004/0107530 A1 | 6/2004 | Lee |
| 2004/0163206 A1 | 8/2004 | Oh |
| 2004/0194250 A1 | 10/2004 | Conrad et al. |
| 2004/0231093 A1 | 11/2004 | Oh |
| 2005/0066469 A1 | 3/2005 | Oh et al. |
| 2005/0125940 A1 | 6/2005 | McDowell |
| 2005/0177974 A1 | 8/2005 | Conrad et al. |
| 2005/0198769 A1 | 9/2005 | Lee et al. |
| 2005/0262658 A1 | 12/2005 | Conrad et al. |
| 2006/0075727 A1 | 4/2006 | Kim et al. |
| 2006/0102005 A1 | 5/2006 | Oh |
| 2006/0117721 A1 | 6/2006 | Lee |
| 2006/0117723 A1 | 6/2006 | Yoo |
| 2006/0130265 A1 | 6/2006 | Oh et al. |
| 2006/0130447 A1 | 6/2006 | Seo et al. |
| 2006/0130448 A1 | 6/2006 | Han et al. |
| 2006/0130449 A1 | 6/2006 | Han |
| 2006/0137310 A1 | 6/2006 | Conrad et al. |
| 2006/0230722 A1 | 10/2006 | Oh et al. |
| 2006/0254226 A1 | 11/2006 | Jeon |
| 2006/0272299 A1 | 12/2006 | Choi |
| 2006/0288671 A1 | 12/2006 | Oh et al. |
| 2007/0039292 A1 | 2/2007 | Oh |
| 2007/0079584 A1 | 4/2007 | Kim |
| 2007/0079586 A1 | 4/2007 | Kim |
| 2007/0084159 A1 | 4/2007 | Oh et al. |
| 2007/0084160 A1 | 4/2007 | Kim |
| 2007/0119129 A1 | 5/2007 | Jeon |
| 2007/0144116 A1 | 6/2007 | Hong et al. |
| 2007/0175185 A1 | 8/2007 | Kim et al. |
| 2007/0209334 A1 | 9/2007 | Conrad |
| 2007/0214754 A1 | 9/2007 | Kim |
| 2007/0234687 A1 | 10/2007 | Ni |
| 2007/0234691 A1 | 10/2007 | Han et al. |
| 2008/0196194 A1 | 8/2008 | Conrad |
| 2008/0263813 A1 | 10/2008 | Han et al. |
| 2008/0263815 A1 | 10/2008 | Oh |
| 2008/0264014 A1 | 10/2008 | Oh et al. |
| 2008/0289139 A1 | 11/2008 | Makarov et al. |
| 2008/0289140 A1 | 11/2008 | Courtney et al. |
| 2008/0289306 A1 | 11/2008 | Han et al. |
| 2009/0144932 A1 | 6/2009 | Yoo |
| 2009/0193613 A1 | 8/2009 | Ruben et al. |
| 2009/0205161 A1 | 8/2009 | Conrad |
| 2009/0229071 A1 | 9/2009 | Fester et al. |
| 2009/0229074 A1 | 9/2009 | Oh |
| 2009/0235482 A1 | 9/2009 | Tanner et al. |
| 2009/0300871 A1 | 12/2009 | Seo et al. |
| 2009/0313958 A1 | 12/2009 | Gomiciaga-Pereda et al. |
| 2010/0043170 A1 | 2/2010 | Ni |
| 2010/0115727 A1 | 5/2010 | Oh |
| 2010/0162517 A1 | 7/2010 | Han et al. |
| 2010/0175217 A1 | 7/2010 | Conrad |
| 2010/0192776 A1 | 8/2010 | Oh et al. |

(56) References Cited

U.S. PATENT DOCUMENTS

| | | |
|---|---|---|
| 2010/0223752 A1 | 9/2010 | Conrad |
| 2010/0229323 A1 | 9/2010 | Conrad |
| 2010/0229325 A1 | 9/2010 | Conrad |
| 2010/0229330 A1 | 9/2010 | Park et al. |
| 2010/0229334 A1 | 9/2010 | Conrad |
| 2010/0251506 A1 | 10/2010 | Conrad |
| 2010/0269289 A1 | 10/2010 | Ruben |
| 2010/0299865 A1 | 12/2010 | Conrad |
| 2010/0299866 A1 | 12/2010 | Conrad |
| 2011/0146024 A1 | 6/2011 | Conrad |
| 2011/0214247 A1 | 9/2011 | Stephens et al. |
| 2011/0219576 A1 | 9/2011 | Conrad |
| 2011/0240526 A1 | 10/2011 | Tammera et al. |
| 2011/0289720 A1 | 12/2011 | Han et al. |
| 2011/0296648 A1 | 12/2011 | Kah, Jr. |
| 2011/0314631 A1 | 12/2011 | Conrad |
| 2012/0047682 A1 | 3/2012 | Makarov et al. |
| 2012/0117753 A1 | 5/2012 | Kim et al. |
| 2012/0216368 A1 | 8/2012 | Maeda et al. |
| 2012/0222232 A1 | 9/2012 | Conrad |
| 2012/0222238 A1 | 9/2012 | Conrad |
| 2012/0222240 A1 | 9/2012 | Conrad |
| 2012/0222243 A1 | 9/2012 | Conrad |
| 2012/0222247 A1 | 9/2012 | Conrad |
| 2012/0222248 A1 | 9/2012 | Conrad |
| 2012/0222252 A1 | 9/2012 | Conrad |
| 2012/0222253 A1 | 9/2012 | Conrad |
| 2012/0222255 A1 | 9/2012 | Conrad |
| 2012/0222257 A1 | 9/2012 | Conrad |
| 2012/0222258 A1 | 9/2012 | Conrad |
| 2012/0222262 A1 | 9/2012 | Conrad |
| 2012/0311814 A1 | 12/2012 | Kah, Jr. |
| 2013/0008140 A1 | 1/2013 | Pike et al. |
| 2013/0145575 A1 | 6/2013 | Conrad |
| 2013/0185893 A1 | 7/2013 | Conrad |
| 2014/0013538 A1 | 1/2014 | Dyson et al. |
| 2014/0020203 A1 | 1/2014 | Miefalk et al. |
| 2014/0026356 A1 | 1/2014 | Miefalk et al. |
| 2014/0053367 A1 | 2/2014 | Conrad |
| 2014/0059797 A1 | 3/2014 | Kim et al. |
| 2014/0059799 A1 | 3/2014 | Kim et al. |
| 2014/0082883 A1* | 3/2014 | Tran ............... A47L 9/1633 15/353 |
| 2014/0259519 A1 | 9/2014 | Conrad et al. |

FOREIGN PATENT DOCUMENTS

| | | |
|---|---|---|
| EP | 1690487 | 8/2006 |
| WO | WO 2010/044541 | 4/2010 |
| WO | 2014166413 | 10/2014 |

\* cited by examiner

VACUUM CLEANER HAVING CYCLONIC SEPARATOR

CROSS-REFERENCE TO RELATED APPLICATIONS

This application claims priority to U.S. Provisional Patent Application No. 62/067,299, filed on Oct. 22, 2014, the contents of which are hereby incorporated by reference in its entirety.

BACKGROUND

The present invention relates to vacuum cleaner, and more particularly to cyclonic vacuum cleaners.

SUMMARY

In one embodiment, the invention provides a vacuum cleaner including a suction nozzle and a suction source operable to generate an airflow through the vacuum cleaner from the suction nozzle through a debris separator to a clean air outlet. The debris separator operable to separate debris from the airflow and including a housing having a upper end and a lower end, a cyclonic separator including a cylindrical wall having a first end and a second end, the cylindrical wall located in within the housing, the cyclonic separator further including a dirty air inlet, a clean air outlet, an end wall at the first end of the cylindrical wall, and a debris outlet adjacent the second end of the cylindrical wall. The debris separator further includes a lid coupled to the upper end of the housing, a debris collection chamber located within the housing and in fluid communication with the debris outlet of the cyclonic separator, and a door coupled to the lower end of the housing and movable from a closed position to an open position to empty the debris collection chamber through the lower end of the housing. A portion of the cyclonic separator is removable from the housing through the lower end of the housing.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
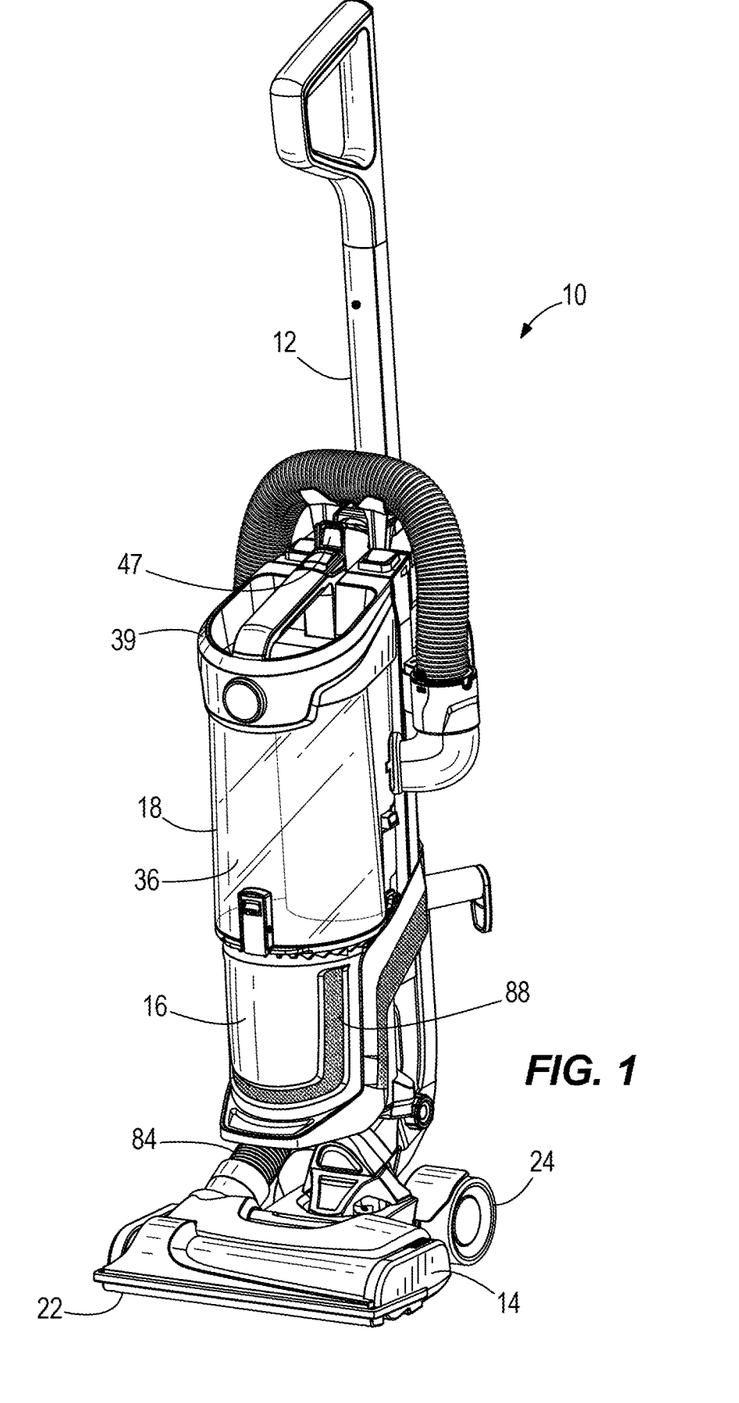
FIG. 1 is a perspective view of a vacuum cleaner according to one embodiment of the invention.

FIG. 1 illustrates a vacuum cleaner 10 accordingly to one embodiment. The illustrated vacuum cleaner 10 includes a handle 12, a base 14, a suction source 16, and a debris separator 18. The handle 12 is pivotally coupled to the base 14 and the handle 12 extends in generally a vertical orientation or upwardly from the base 14 in a storage position, and typically movable to a tilted operable position. The base 14 includes a suction nozzle 22 and wheels 24 that facilitate movement of the base 14 along a surface being cleaned.

Figure 6:
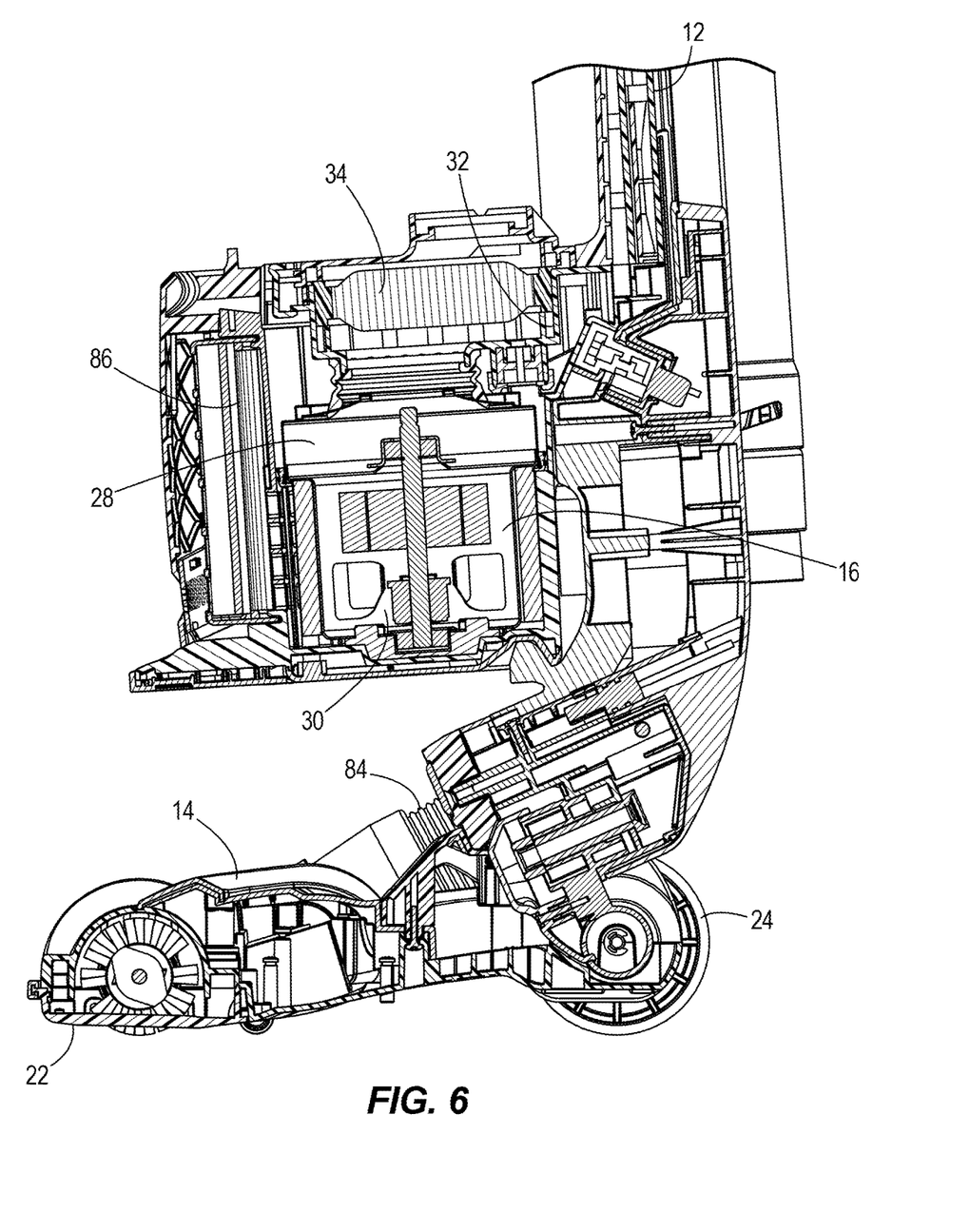
FIG. 6 is cross-sectional view of a portion of the vacuum cleaner of FIG. 1.

Referring to FIG. 6, the suction source 16 includes a fan 28 and a motor 30 that rotates the fan 28 to generate an airflow through the vacuum cleaner from the suction nozzle 22 through the debris separator 18 to a clean air exhaust 88. A suction source inlet chamber 32 is located positioned above the suction source 16. A premotor filter 34 is located in the chamber 32 to filter the airflow downstream from the debris separator 18 before traveling through the suction source 16.

Figure 2:
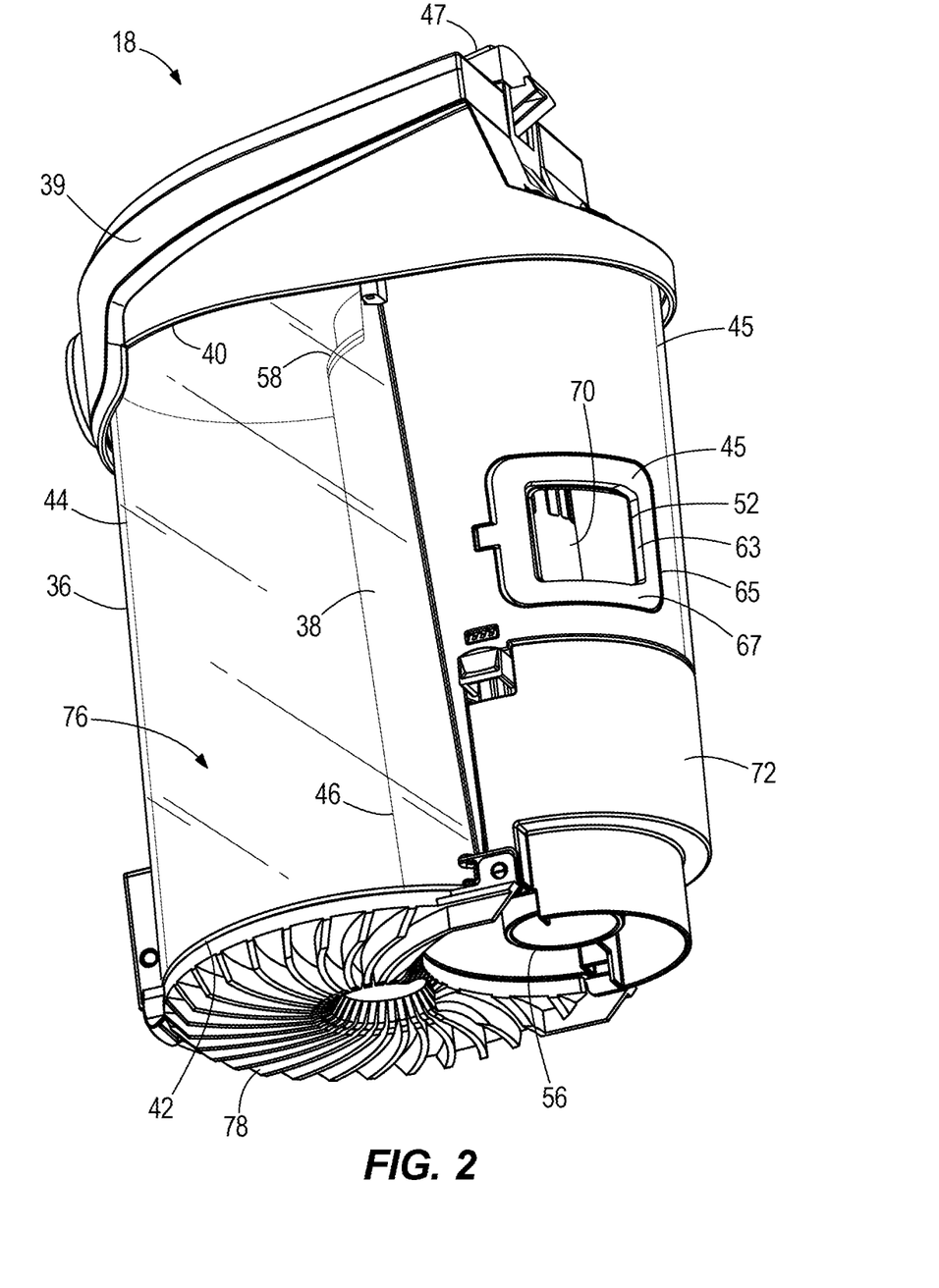
FIG. 2 is a perspective view of a debris separator of the vacuum cleaner of FIG. 1
Figure 4:
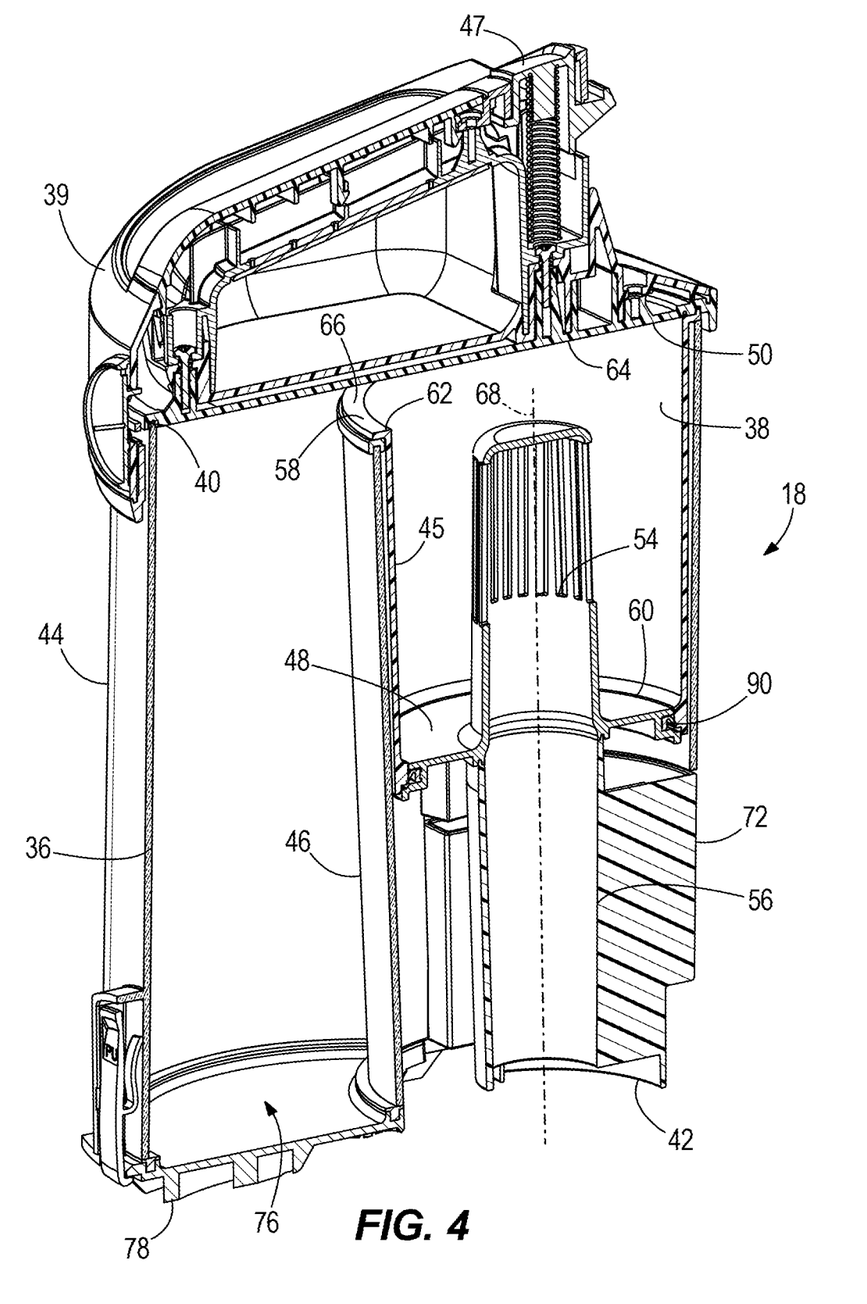
FIG. 4 is a cross-sectional view of the debris separator of FIG. 2.
Figure 5:
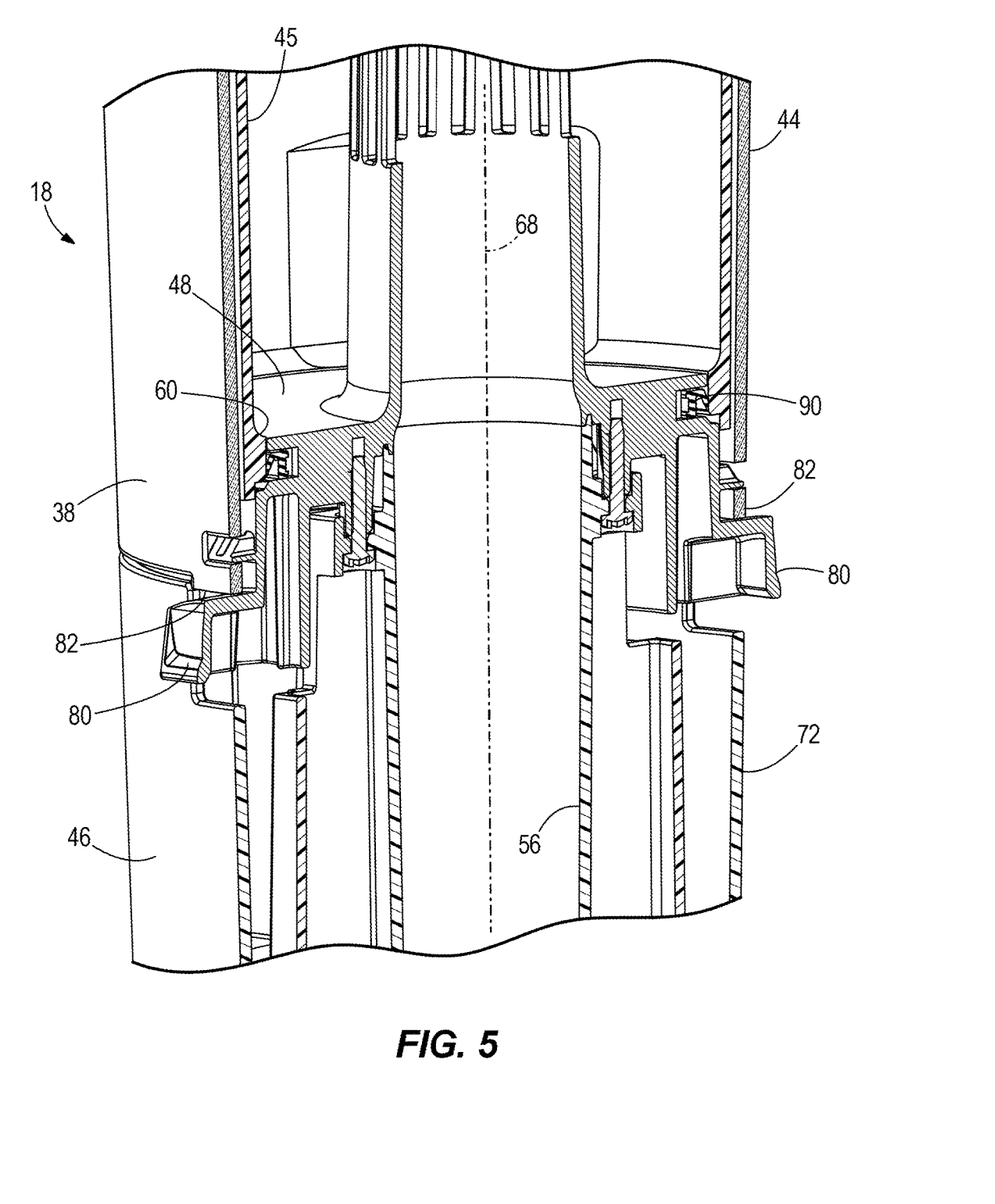
FIG. 5 is an enlarged view of the cross-section of FIG. 4.

Referring to FIGS. 2, 4, and 5, the debris separator 18 includes a housing 36, a cyclonic separator 38 and a debris collection chamber 76 located within the housing 36, and a lid 39. The housing 36 includes an upper end 40, a lower end 42, and an outer wall 44 that extends between the upper and lower ends 40, 42. In the illustrated embodiment, at least a portion of the outer sidewall 44 is generally cylindrical. The housing 36 further includes an inner wall 46 that extends from the lower end 42 toward the upper end 40. In the illustrated embodiment, at least a portion of the inner wall 46 does not extend all of the way to the upper end 40. In the illustrated embodiment, the lid 39 is fixed to the upper end 40 of the housing 36 so that the lid 39 is immovable relative to the housing 36 (i.e., the lid 39 cannot be removed by the user). The debris separator 18 includes a latch 47 to that removable couples the debris separator 18 to the vacuum cleaner 10.

As shown in FIGS. 2 and 4, the cyclonic separator 38 includes a cylindrical wall 45, a first end wall 48, a second end wall 50, a dirty air inlet 52, a clean air outlet 54, a clean air duct 56 and a debris outlet 58. The cylindrical wall 45 includes a first end 60 and a second end 62. The dirty air inlet 52 is adjacent the first end 60 of the wall 45. The first end wall 48 is located at the first end 60 of the wall 45 and the clean air outlet 54 extends through the first end wall 48. The second end wall 50 is located at the second end 62 of the cylindrical wall 45. As shown in the illustrated embodiment, the second end wall 50 is formed by a portion 64 of the lid 39. The debris outlet 58 is adjacent the second end 62 of the wall 45 and between an end of the wall 45 and the second end wall 50 that is formed by the portion 64 of the lid 39. In the illustrated embodiment, the wall 45 includes a notch 66 that partially defines the outlet 58. Additionally, the debris outlet 58 is located between at least a portion of an end of the inner wall 46 and the upper end 40 of the housing. Stated another way, the debris outlet 58 is located between at least a portion of an end of the inner wall 46 and the lid 39 forming the second end wall 50. The cyclonic separator 38 further includes a longitudinal axis 68 along the cylindrical wall 45 and the axis 68 is centrally located within the wall 45. The cyclonic separator 38 is orientated such that the axis 68 extends in a generally vertical orientation when the vacuum cleaner is in its storage position. The generally vertical orientation includes in various embodiments orientations that are tilted or angled but being generally more upright than laying over, i.e. being tilted less than about 45 degrees.

Figure 7:
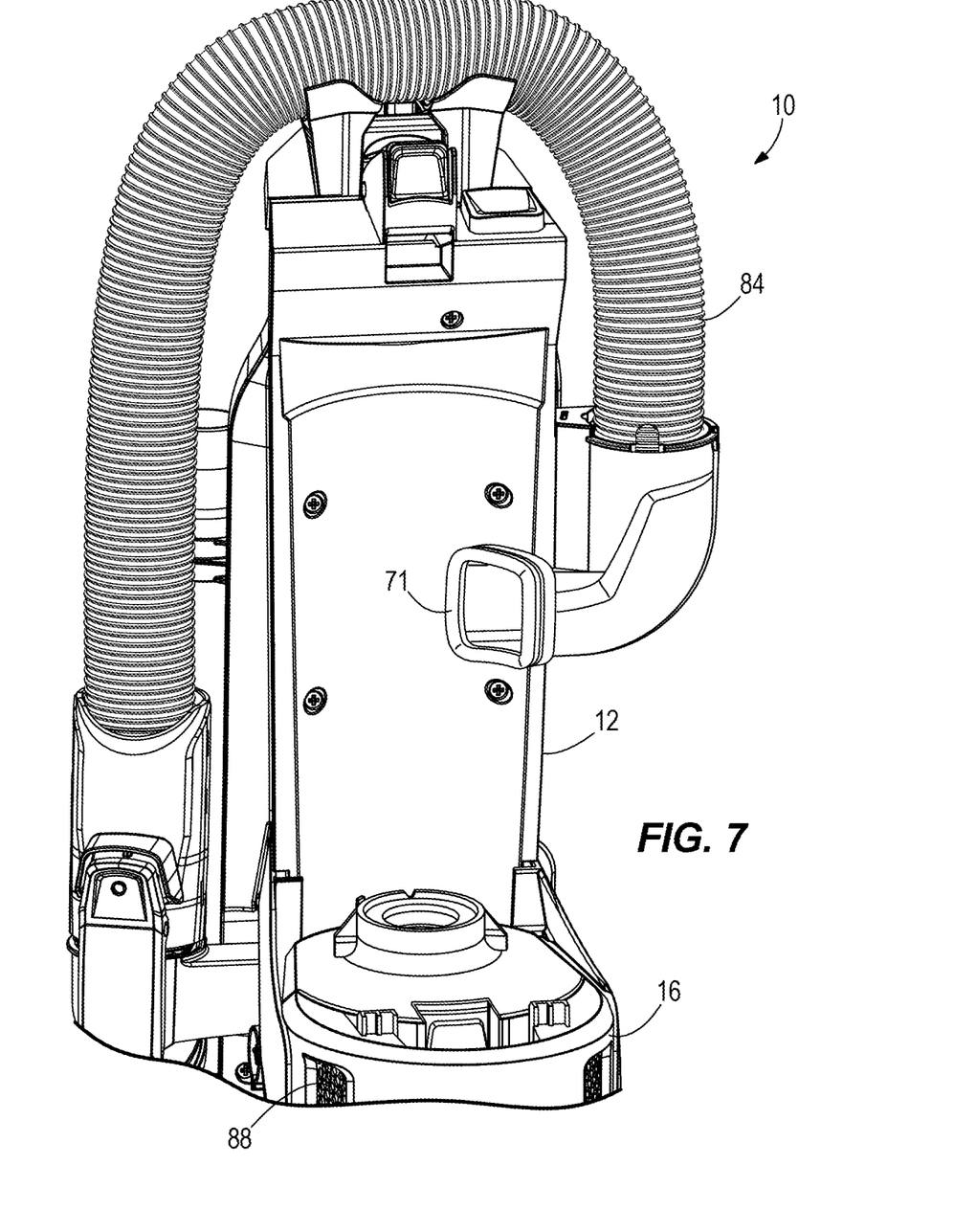
FIG. 7 is a perspective view of the vacuum cleaner of FIG. 1 with the debris separator removed.

Referring to FIGS. 2 and 7, the illustrated dirty air inlet 52 include an aperture 63 that extends through the cylindrical wall 45 and an aperture 65 that extends through the outer sidewall 44 of the housing 36. The aperture 65 is larger than the aperture 63, which exposes a portion 67 of the cylindrical wall 45 around the perimeter of the aperture 63. A conduit 84, which extends from the suction nozzle 22 to the debris separator 18, includes a seal 71 (FIG. 7) at an end of the conduit 84. When the debris separator 18 is attached to the conduit 84, the seal 71 is received in the aperture 65 and contacts the exposed portion 67 of the cylindrical wall 45. Contact between the seal 71 and the exposed portion 67 within the aperture 65 reduces the likelihood that air and debris will pass between the seal 71 and the debris separator 18 and not into the debris separator 18.

Referring to FIGS. 2 and 4, the debris collection chamber 76 is located between the inner wall 46 and the outer wall 44 of the housing 36 below the debris outlet 58. The debris collection chamber 76 is bounded in part by the inner wall 46 and outer walls 44 of the housing. In the illustrated embodiment, the debris collection chamber 76 is adjacent the cyclonic separator 38 in generally a side-by-side arrangement.

The debris separator 18 further includes a perforated tube 70 extending from the first end wall 48 of the cyclonic separator 38 forming the clean air outlet 54. In the illustrated embodiment, the perforated tube 70 and the first end wall 48 are integrally formed as a single component. The perforated tube 70 may be perforated using holes, slots, screen, mesh, or other perforation.

Figure 3:
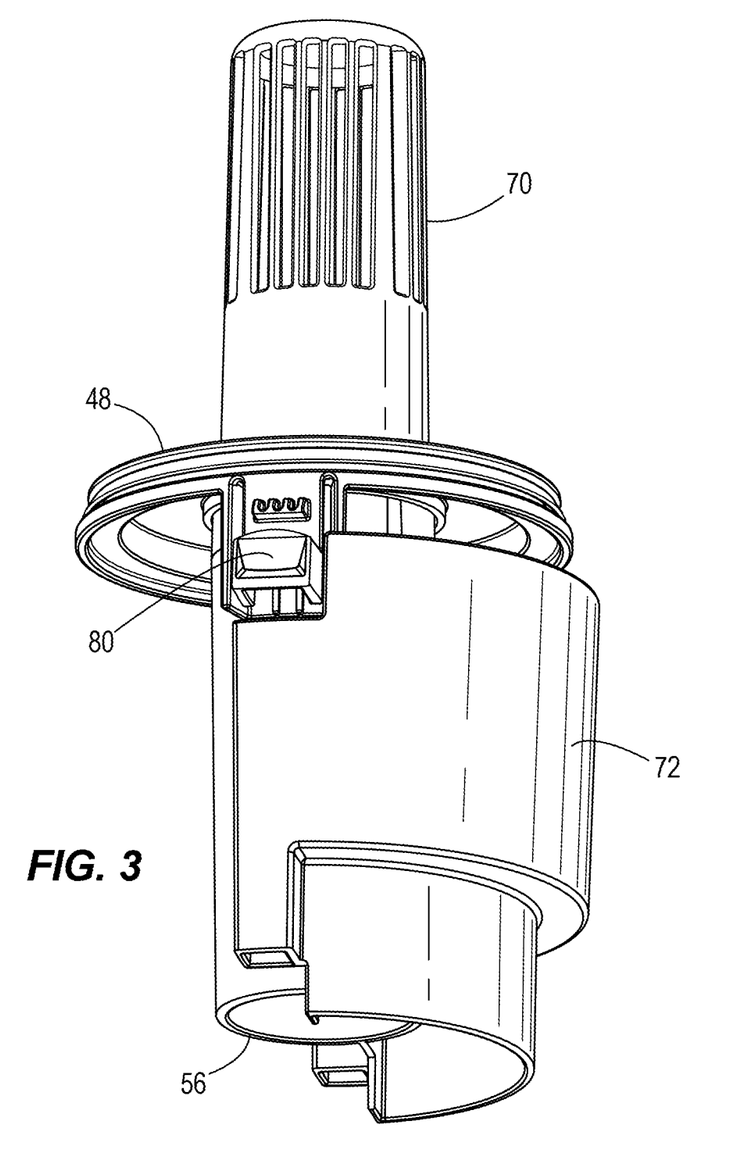
FIG. 3 is a perspective view of a portion of the debris separator of FIG. 2.

In the illustrated embodiment, a housing portion 72 removable with the clean air duct 56 surrounds at least a portion of the clean air duct 56. In this embodiment, the first end wall 48, the clean air duct 56, the housing portion 72, and the perforated tube 70 are removable from the housing 36 through the lower end 42 of the housing 36 while the cylindrical wall 45 is not removable from the housing 36 through the lower end 42 of the housing 36. As best seen in FIGS. 3 and 5, latches 80, which may be integral with the end wall 48 or removable housing portion, attach the end wall 48, the duct 56, the housing portion 72, and the tube 70 to the housing 36. The latches 80 extend through apertures 82 in the housing 36 to attach the end wall 48, the duct 56 and the tube 70 to the housing 36. To remove the end wall 48, the duct 56 and the tube 70 from the housing 36, the user presses the latches 80 through the apertures 82 and slides the end wall 48, the duct 56 and the tube 70 through the open lower end 42 of the housing 36. A seal 90, which is carried on the end wall 48 in the illustrated embodiment, seals between the end wall 48 and the cylindrical wall 45.

The door 78 is located at the lower end 42 of the housing 36. In the illustrated embodiment, the door 78 is pivotally coupled to the housing 36. The door 78 can be opened to empty the debris collection chamber 76.

In operation, referring to FIG. 1, the suction source 16 generates an airflow that draws debris and the airflow through the suction nozzle 22. The airflow and entrained debris travel through the conduit 84 to the cyclonic separator 38. The airflow and debris then travel through the dirty air inlet 52 and into to the cylindrical wall 45. The airflow and debris are rotated about the longitudinal axis 68 of the separator 38, which causes the debris to separate from the airflow. The debris is discharged over the cylindrical wall 45 through the debris outlet 58 and into the debris collection chamber 76. The clean airflow then travels through the perforated tube 70 and exist the cyclonic separator through the clean air outlet 54. The clean airflow then travels through the clean air duct 56 and into the suction source inlet chamber 32. The premotor filter 34 then further filters the clean airflow and the clean airflow travels through the suction source 16. The clean airflow is then discharged to an exhaust filter 86, which further filters the clean airflow, before being discharged from the vacuum cleaner 10 through the clean air exhaust 88.

After use, the user can empty the debris collection chamber 76 by opening the door 78. If debris accumulates within the cylindrical wall 45, the user can activate the latches 80 to remove the end wall 48, the duct 56 and the tube 70 through the lower end 42 of the housing 36 to remove or empty any debris that accumulated within the wall 45 and on the wall 48.

While the debris separator was illustrated with reference to an upright vacuum cleaner, the present debris separator may be used with canister vacuums, hand-held vacuums, other types of upright vacuums, and other style vacuums. Various features and advantages of the invention are set forth in the following claims.

What is claimed is:

1. A vacuum cleaner comprising:
   a suction nozzle;
   a suction source operable to generate an airflow through the vacuum cleaner from the suction nozzle through a debris separator to a clean air exhaust;
   the debris separator operable to separate debris from the airflow, the debris separator including
      a housing having a upper end and a lower end,
      a cyclonic separator including a cylindrical wall having a first end and a second end, the cylindrical wall located in within the housing, the cyclonic separator further including a dirty air inlet, a clean air outlet, an end wall at the first end of the cylindrical wall, and a debris outlet adjacent the second end of the cylindrical wall,
      a lid coupled to the upper end of the housing,
      a debris collection chamber located within the housing and in fluid communication with the debris outlet of the cyclonic separator,
      a door coupled to the lower end of the housing and movable from a closed position to an open position to empty the debris collection chamber through the lower end of the housing, and
   wherein a portion of the cyclonic separator is removable from the housing through the lower end of the housing, wherein the portion of the cyclonic separator moves relative to the door when the door is in the closed position.

2. The vacuum cleaner of claim 1, wherein the lid is fixed to the upper end of the housing such that the lid is immovable relative to the housing.

3. The vacuum cleaner of claim 1, wherein the debris collection chamber is adjacent the cyclonic separator in generally a side-by-side arrangement.

4. The vacuum cleaner of claim 3, wherein the debris separator includes a latch that removably couples the debris separator to the vacuum cleaner.

5. The vacuum cleaner of claim 1, wherein the end wall of the cyclonic separator is a first end wall, wherein the lid forms a second end wall of the cyclonic separator at the second end of the cylindrical wall.

6. The vacuum cleaner of claim 5, wherein the second end wall defines a portion of the debris outlet.

7. The vacuum cleaner of claim 1, wherein the portion of the cyclonic separator that is removable from the housing through the lower end of the housing includes the end wall of the cyclonic separator.

8. The vacuum cleaner of claim 7, wherein the clean air outlet extends through the end wall.

9. The vacuum cleaner of claim 8, wherein the cyclonic separator includes a perforated tube located within the cylindrical wall, the perforated tube extending from the end wall of the cyclonic separator and forming the clean air outlet.

10. The vacuum cleaner of claim 9, wherein the perforated tube is removable through the lower end of the housing.

11. The vacuum cleaner of claim 7, wherein the cylindrical wall is not removable from the housing through the lower end of the housing with the end wall.

12. The vacuum cleaner of claim 11, wherein the cyclonic separator includes a seal between the end wall and the cylindrical wall.

13. The vacuum cleaner of claim 12, wherein the seal is coupled to the end wall and removable with the end wall through the lower end of the housing.

14. The vacuum cleaner of claim 1, wherein the debris separator includes a clean air duct that extends from the clean air outlet to the lower end of the housing between the clean air outlet and the suction source, and wherein the clean air duct is removable from the lower end of the housing.

15. The vacuum cleaner of claim 14, wherein a housing portion removable with the clean air duct surrounds at least a portion of the clean air duct.

16. The vacuum cleaner of claim 14, wherein the debris separator includes a latch that couples the housing portion and the clean air duct to the housing.

17. The vacuum cleaner of claim 16, wherein a portion of the latch extends through an aperture in the housing to couple the housing portion and the clean air duct to the housing.

18. The vacuum cleaner of claim 1, wherein the dirty air inlet is adjacent the end wall of the cyclonic separator.

19. The vacuum cleaner of claim 1, wherein the cyclonic separator includes a longitudinal axis along the cylindrical wall extending in generally a vertical orientation.

20. The vacuum cleaner of claim 1, wherein the housing includes an inner wall that extends from the lower end toward the upper end of the housing, wherein the debris outlet is located between the inner wall and the upper end of the housing and the debris collection chamber is bounded in part between the inner wall and outer walls of the housing.

21. The vacuum cleaner of claim 3, wherein the housing includes an inner wall that extends from the lower end toward the upper end of the housing, and the debris outlet is located between the inner wall and the lid forming the second end wall of the cyclonic separator, and the debris collection chamber is bounded in part by the inner wall and outer walls of the housing.

22. The vacuum cleaner of claim 5, wherein the housing includes an inner wall that extends from the lower end toward the upper end of the housing, and the debris outlet is located between the inner wall and the lid forming the second end wall of the cyclonic separator, and the debris collection chamber is bounded in part by the inner wall and outer walls of the housing.

23. The vacuum cleaner of claim 9, wherein the housing includes an inner wall that extends from the lower end toward the upper end of the housing, and the debris outlet is located between the inner wall and the lid forming the second end wall of the cyclonic separator, and the debris collection chamber is bounded in part by the inner wall and outer walls of the housing.

24. The vacuum cleaner of claim 15, wherein the housing includes an inner wall that extends from the lower end toward the upper end of the housing, and the debris outlet is located between the inner wall and the lid forming the second end wall of the cyclonic separator, and the debris collection chamber is bounded in part by the inner wall and outer walls of the housing.

25. The vacuum cleaner of claim 19, wherein the housing includes an inner wall that extends from the lower end toward the upper end of the housing, and the debris outlet is located between the inner wall and the lid forming the second end wall of the cyclonic separator, and the debris collection chamber is bounded in part by the inner wall and outer walls of the housing.

26. The vacuum cleaner of claim 1, further comprising a conduit between the suction nozzle and the debris separator and a seal coupled to the conduit, wherein the housing of the debris separator includes an aperture adjacent the dirty air inlet of the cyclonic separator, wherein the seal extends through the aperture of the housing and contacts the cylindrical wall of the cyclonic separator to provide fluid communication between the conduit and the dirty air inlet.

* * * * *